(12) United States Patent
Park

(10) Patent No.: US 8,504,274 B2
(45) Date of Patent: Aug. 6, 2013

(54) ADAPTIVE CRUISE CONTROL METHOD ON INCLINE

(75) Inventor: Byung Suk Park, Gyeonggi-do (KR)

(73) Assignee: Mando Corporation, Pyeongtaek-Si (KR)

( * ) Notice: Subject to any disclaimer, the term of this patent is extended or adjusted under 35 U.S.C. 154(b) by 84 days.

(21) Appl. No.: 13/105,594

(22) Filed: May 11, 2011

(65) Prior Publication Data

US 2011/0282558 A1 Nov. 17, 2011

(30) Foreign Application Priority Data

May 12, 2010 (KR) ........................ 10-2010-0044692

(51) Int. Cl.
  *B60T 8/24* (2006.01)
  *G05D 1/00* (2006.01)
  *G05D 5/00* (2006.01)
  *G06F 7/00* (2006.01)
  *G06F 17/00* (2006.01)

(52) U.S. Cl.
  USPC .................... 701/94; 701/1; 701/93

(58) Field of Classification Search
  USPC ................ 701/48, 70, 76, 94; 340/440
  See application file for complete search history.

(56) References Cited

U.S. PATENT DOCUMENTS

| 5,944,766 | A * | 8/1999 | White | 701/94 |
| 6,847,887 | B1 * | 1/2005 | Casino | 701/461 |
| 7,590,481 | B2 * | 9/2009 | Lu et al. | 701/70 |
| 7,885,750 | B2 * | 2/2011 | Lu | 701/90 |
| 8,055,424 | B2 * | 11/2011 | Salman et al. | 701/80 |
| 2006/0095195 | A1 * | 5/2006 | Nishimura et al. | 701/96 |
| 2009/0037069 | A1 * | 2/2009 | Inoue et al. | 701/94 |
| 2009/0287388 | A1 * | 11/2009 | Bach et al. | 701/76 |
| 2010/0017058 | A1 * | 1/2010 | Lu et al. | 701/38 |
| 2010/0017061 | A1 * | 1/2010 | Lu et al. | 701/41 |
| 2010/0017066 | A1 * | 1/2010 | Lu et al. | 701/45 |
| 2010/0017070 | A1 * | 1/2010 | Doering et al. | 701/48 |

FOREIGN PATENT DOCUMENTS

KR 10-2008-0022771 A 3/2008

* cited by examiner

*Primary Examiner* — Khoi Tran
*Assistant Examiner* — Rachid Bendidi
(74) *Attorney, Agent, or Firm* — McDermott Will & Emery LLP

(57) ABSTRACT

Adaptive cruise control method improves traveling performance and stoppage maintenance performance on an incline. During adaptive cruise control, a gradient of a road is estimated based on a vehicle acceleration and longitudinal acceleration to enable compensation of a resistance torque with respect to the gradient of the road, which prevents deterioration of a traveling speed of a vehicle on an incline. Also, compensating for a brake torque to prevent the vehicle from being pushed rearward when the vehicle stops or starts to go on an incline may prevent deterioration of performance on an incline.

4 Claims, 2 Drawing Sheets

ADAPTIVE CRUISE CONTROL METHOD ON INCLINE

CROSS-REFERENCE TO RELATED APPLICATION

This application claims the benefit of Korean Patent Application No. 2010-0044692, filed on May 12, 2010 in the Korean Intellectual Property Office, the disclosure of which is incorporated herein by reference.

BACKGROUND

1. Field

Embodiments of the present invention relate to an adaptive cruise control method on an incline to improve traveling performance and stoppage maintenance performance on an incline.

2. Description of the Related Art

Generally, an Adaptive Cruise Control (ACC) system automatically controls longitudinal behavior of a vehicle as a control target based on circumferences of an object ahead of the vehicle using front sensors including a radar, camera, etc. This system may reduce driver stress due to repeated acceleration, deceleration and stoppage required to maintain an appropriate distance with an object ahead of the vehicle during traveling. Automated traveling of the vehicle at a predetermined speed and automated acceleration or deceleration dependent on movement of an object ahead of the vehicle may improve vehicle fuel economy and ensure smooth traffic flow.

The ACC system performs adaptive cruise control by controlling acceleration of the vehicle to follow a target speed preset by a driver. During implementation of adaptive cruise control, deceleration and acceleration of the vehicle are controlled to maintain an appropriate distance with an object ahead of the vehicle using front sensors which function to sense circumferences of the object. This is realized in a manner of giving commands to an acceleration control device, an engine control device and a braking control device based on information from the front sensors of the vehicle, such as a distance between the vehicle and an object ahead of the vehicle, relative speeds, an orientation angle of the vehicle with respect to a movement direction, etc.

However, the ACC system does not consider a gradient of roads and simply controls the vehicle using only acceleration of the vehicle calculated from a wheel speed. Therefore, if the vehicle travels from flat land to an ascent, vehicle speed is reduced below a target speed, causing deterioration in traveling performance. In addition, if brake force suitable for flat land is maintained even on an ascent because a gradient of the ascent is not known, this may cause the vehicle to be pushed rearward due to insufficient brake force. On the contrary, if brake force suitable for flat land is maintained even on a descent, insufficient brake force may cause deterioration in stoppage maintenance performance.

SUMMARY

Therefore, it is an aspect of the present invention to provide an adaptive cruise control method on an incline to improve traveling performance and stoppage maintenance performance on an incline via estimation of a gradient of the incline.

Additional aspects of the invention will be set forth in part in the description which follows and, in part, will be obvious from the description, or may be learned by practice of the invention.

In accordance with one aspect of the present invention, an adaptive cruise control method on an incline includes sensing a wheel speed and a longitudinal acceleration during adaptive cruise control, calculating a vehicle acceleration based on the sensed wheel speed, estimating a gradient of a road from the calculated vehicle acceleration and the longitudinal acceleration, calculating a resistance torque based on the gradient of the road, and controlling traveling and stoppage maintenance of a vehicle using the resistance torque.

The traveling control of the vehicle may include compensating for a resistance torque of the vehicle traveling on an incline having a gradient, to prevent deterioration in a traveling speed of the vehicle.

The stoppage maintenance control of the vehicle may include compensating for a brake torque for stoppage maintenance by adding the resistance torque of the vehicle based on the gradient of the incline to a brake torque on flat land when the vehicle is stopped or starts to go on the incline.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
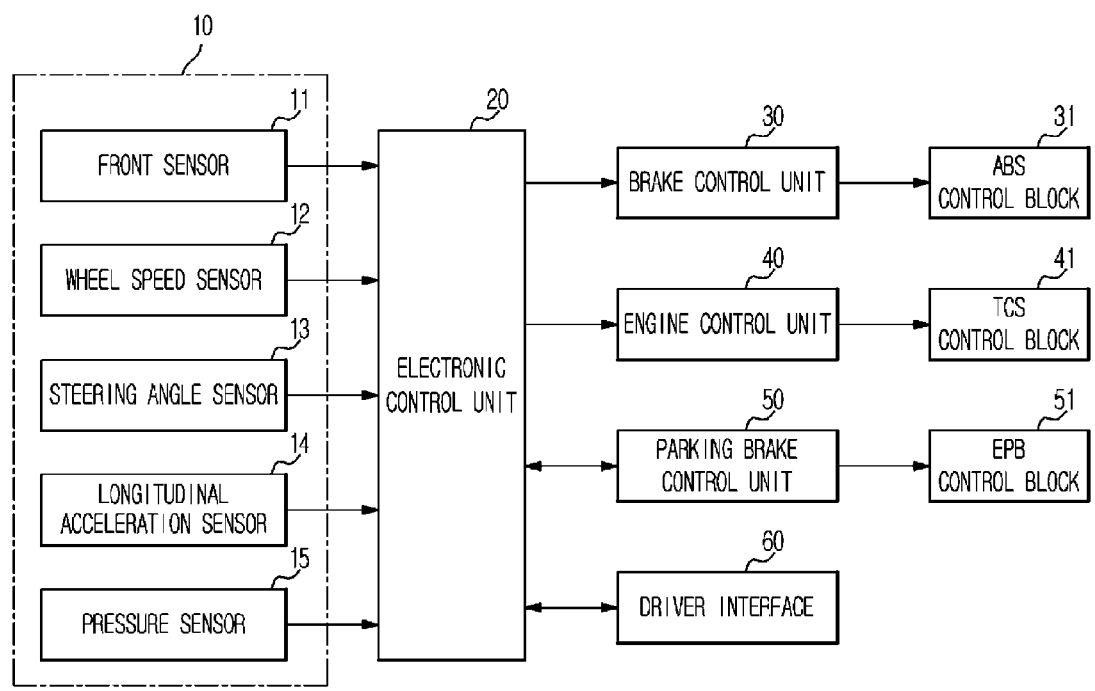
FIG. 1 is a block diagram of an adaptive cruise control system according to an embodiment of the present invention.

Reference will now be made in detail to the embodiments of the present invention, examples of which are illustrated in the accompanying drawings, wherein like reference numerals refer to like elements throughout.

FIG. 1 is a block diagram of an adaptive cruise control system according to the embodiment of the present invention.

In FIG. 1, the adaptive cruise control system according to the embodiment of the present invention includes a sensor unit 10, an electronic control unit 20, a brake control unit 30, an engine control unit 40, a parking brake control unit 50, and a driver interface 60.

The sensor unit 10 serves to collect various sensor information of a vehicle and includes a front sensor 11, a wheel speed sensor 12, a steering angle sensor 13, a longitudinal acceleration sensor 14, and a pressure sensor 15.

The front sensor 11 senses a relative speed of an object ahead of the vehicle and a distance between the vehicle and the object and transmits the sensed signals to the electronic control unit 20. The wheel speed sensor 12 is installed to each of wheels FL, RR, RL and FR to sense a speed of the corresponding wheel and transmits the sensed signal to the electronic control unit 20.

The steering angle sensor 13 is provided at a steering wheel column. The steering angle sensor 13 senses a steering angle and an angular speed depending on manipulation of a steering wheel and transmits the sensed signals to the electronic control unit 20.

The longitudinal acceleration sensor 14 senses a longitudinal speed B of the vehicle and transmits the sensed signal to the electronic control unit 20. The pressure sensor 15 senses a pressure of a master cylinder changed based on driver braking intention and transmits the sensed signal to the electronic control unit 20.

The electronic control unit 20 determines brake force and behavior stability of the vehicle upon receiving the signals transmitted from the front sensor 11, the wheel speed sensor 12, the steering angle sensor 13, the longitudinal acceleration sensor 14 and the pressure sensor 15, and outputs signals to control brake pressure and engine torque of the respective wheels FR, RR RL and FR to the brake control unit 30 and the engine control unit 40.

In addition, the electronic control unit 20 calculates a vehicle speed upon receiving the speed of each wheel FL, RR, RF or FR from the wheel speed sensor 12, and calculates a vehicle acceleration A based on the calculated vehicle speed. Thereafter, the electronic control unit 20 estimates a gradient θ of a road based on a difference between the calculated vehicle acceleration A and the longitudinal acceleration B transmitted from the longitudinal acceleration sensor 14. As such, the electronic control unit 20 calculates a resistance torque $T_{resistance}$ with respect to the estimated gradient θ of the road.

Thus, the electronic control unit 20 functions to compensate for a resistance torque $T_{resistance}$ of the vehicle on an incline having a gradient θ using the calculated resistance torque $T_{resistance}$, which results in improved traveling performance of the vehicle.

In addition, even when attempting to automatically stop and go on an incline, the electronic control unit 20 determines brake torque for stoppage maintenance by adding the resistance torque $T_{resistance}$ based on the gradient θ of the incline to a brake torque on flat land. Consequently, the electronic control unit 20 may automatically compensate for the brake torque to keep the vehicle stopped on the incline in proportion to the gradient θ of the incline and also, may calculate optimal brake force for stoppage maintenance, which results in improved stop/start performance.

The brake control unit 30 controls a pressure of brake fluid supplied into a wheel cylinder in response to a brake signal output from the electronic control unit 20, thereby generating a brake pressure in cooperation with an Anti-lock Brake System (ABS) control block 31 to maximize vehicle stability.

The engine control unit 40 controls engine torque based on an engine control signal output from the electronic control unit 20, thereby controlling drive force of an engine in cooperation with a Traction Control System (TCS) control block 41 to maximize vehicle stability.

The parking brake control unit 50 additionally applies a constant brake force to rear wheels RR and RL based on a parking brake control signal output from the electronic control unit 20, thereby distributing brake force in cooperation with an Electronic Parking Brake (EPB) control block 51 to optimize the brake force of the vehicle.

An EPB system to allow a motor to automatically operate a parking brake based on operating states of a vehicle functions to automatically operate or release the parking brake in cooperation with the electronic control unit 20, thereby achieving braking stability in an emergency. The EPB system receives additional brake force operation information of the rear wheels RR and RL from the electronic control unit 20 via CAN communication, thereby additionally applying a constant brake force to the rear wheels RR and RL so as to optimize the brake force of the vehicle.

The driver interface 60 serves as a communication interface with a driver with relation to the beginning of adaptive cruise control, adaptive cruise control modes and control states.

Hereinafter, operation and effects of an adaptive cruise control method of an incline using the above described adaptive cruise control system will be described.

Figure 2:
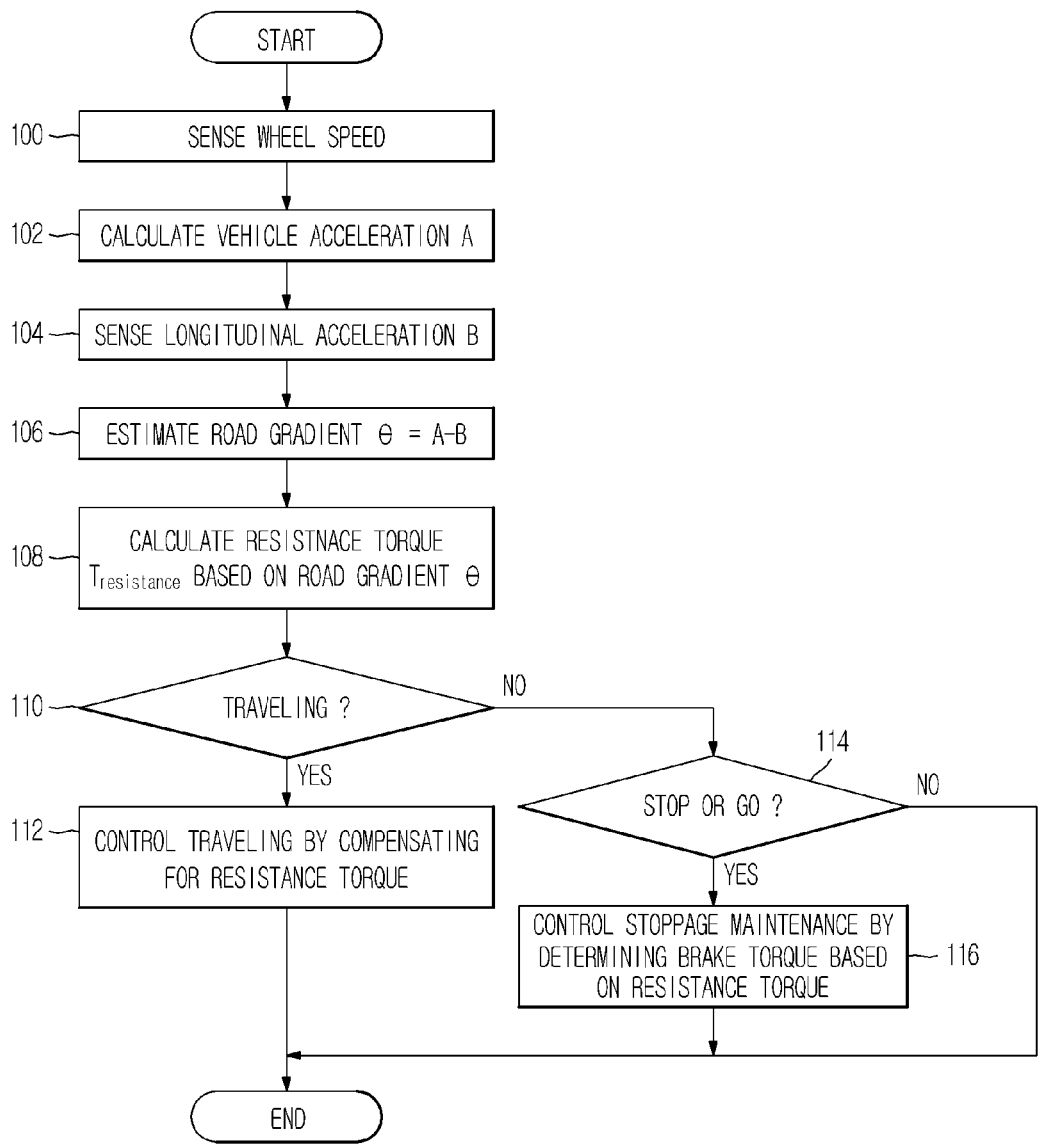
FIG. 2 is a flow chart illustrating an adaptive cruise control method to compensate for performance of a vehicle on an incline using the adaptive cruise control system according to an embodiment of the present invention.

FIG. 2 is a flow chart illustrating an adaptive cruise control method to compensate for performance of a vehicle on an incline using the adaptive cruise control system according to an embodiment of the present invention.

In FIG. 2, during implementation of adaptive cruise control in which longitudinal behavior of the vehicle is controlled based on an object ahead of the vehicle sensed by the front sensor 11, such as a radar, camera or the like, and the acceleration of the vehicle is controlled to follow a target speed while automatically maintaining an appropriate distance with the object, the wheel speed sensor 12 senses the speed of each wheel FL, RR, RL or FR and transmits the sensed signal to the electronic control unit 20 (100).

Thus, the electronic control unit 20 calculates the vehicle speed based on the speed of each wheel FL, RR, RL or FR transmitted from the wheel speed sensor 12 and then, calculates the vehicle acceleration A based on the calculated vehicle speed (102).

In addition, the longitudinal acceleration sensor 14 senses the longitudinal acceleration B of the vehicle and transmits the sensed signal to the electronic control unit 20 (104).

Thus, the electronic control unit 20 estimates a gradient θ of a road based on a difference between the calculated vehicle acceleration A and the longitudinal acceleration B transmitted from the longitudinal acceleration sensor 14 (106). Then, the electronic control unit 20 calculates a resistance torque $T_{resistance}$ with respect to the estimated gradient θ of the road by the following Equation 1 (108).

$$T_{resistance} = [f_{rolling} + k1 \cdot \sin\theta \cdot Mg + f_{air} \cdot V^2] \cdot R \qquad \text{Equation 1}$$

In Equation 1, "$T_{resistance}$" is resistance torque, "$f_{rolling}$" is frictional resistance between the road and a tire, "k1" is a tuning coefficient, "Mg" is a weight of the vehicle, "$f_{air}$" is an air resistance coefficient of the vehicle, "V" is a vehicle speed, and "R" is a dynamic radius of the tire.

Thereafter, the electronic control unit 20 determines whether or not the vehicle is traveling (110). If the vehicle is traveling, the electronic control unit 20 controls traveling of the vehicle by compensating for a resistance torque $T_{resistance}$ of the vehicle on an incline having a gradient θ using the calculated resistance torque $T_{resistance}$, thereby improving traveling performance of the vehicle (112).

If it is determined from operation 110 that the vehicle is not traveling, the electronic control unit 20 determines whether or not the vehicle is stopped or starts to go (114). If the vehicle is stopped or starts to go, the electronic control unit 20 determines brake torque to keep the vehicle stopped by adding the resistance torque $T_{resistance}$ based on the gradient θ of the incline to a brake torque on flat land as described in the following Equation 2.

$$\text{stoppage\_brake torque} = \text{stoppage\_brake torque\_flat land} + \text{stoppage\_brake torque\_incline} \qquad \text{Equation 2}$$

In Equation 2, "stoppage_brake torque_flat land" is brake torque to withstand an idle torque of the engine and keep the vehicle stopped on flat land, and "stoppage_brake torque_incline" is k2×absolute value (sin θ)×Mg×R(k2: a tuning coefficient).

In this way, the brake torque to keep the vehicle stopped on an incline may be automatically compensated in proportion to the absolute value of the incline. Thus, optimal brake force to keep the vehicle stopped on an incline may be calculated, which results in improved stop/start performance.

As is apparent from the above description, even when a vehicle travels on an incline, resistance torque of the vehicle is automatically compensated, which prevents deterioration of a traveling speed of the vehicle on the incline. Further, automated compensation of brake torque prevents the vehicle from being pushed rearward when the vehicle is stopped or starts to go on an incline, thereby preventing deterioration of performance on an incline.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An adaptive cruise control method on an incline comprising:

sensing, by a sensing unit, a wheel speed and a longitudinal acceleration during adaptive cruise control;

calculating, by an electronic control unit, a vehicle acceleration based on the sensed wheel speed;

estimating, by the electronic control unit, a gradient of a road from the calculated vehicle acceleration and the longitudinal acceleration;

calculating, by the electronic control unit, a resistance torque based on the estimated gradient of the road; and controlling, by the electronic control unit, traveling and stoppage maintenance of a vehicle using the calculated resistance torque.

2. The method according to claim 1, wherein the traveling control of the vehicle includes compensating for a resistance torque of the vehicle traveling on an incline having a gradient, to prevent deterioration in a traveling speed of the vehicle.

3. The method according to claim 1, wherein the stoppage maintenance control of the vehicle includes compensating for a brake torque for stoppage maintenance by adding the resistance torque of the vehicle based on the gradient of the incline to a brake torque on flat land when the vehicle stops or starts to go on the incline.

4. The method according to claim 1, wherein the gradient estimation of the road includes estimating the gradient of the road based on a difference between the calculated vehicle acceleration and the longitudinal acceleration.

* * * * *